United States Patent

Oya

(10) Patent No.: US 9,914,476 B2
(45) Date of Patent: Mar. 13, 2018

(54) VEHICLE STEERING SYSTEM

(71) Applicant: JTEKT CORPORATION, Osaka-shi, Osaka (JP)

(72) Inventor: Toshiaki Oya, Sakai (JP)

(73) Assignee: JTEKT CORPORATION, Osaka-shi (JP)

( * ) Notice: Subject to any disclaimer, the term of this patent is extended or adjusted under 35 U.S.C. 154(b) by 52 days.

(21) Appl. No.: 15/257,228

(22) Filed: Sep. 6, 2016

(65) Prior Publication Data

US 2017/0073001 A1    Mar. 16, 2017

(30) Foreign Application Priority Data

Sep. 11, 2015 (JP) ................. 2015-179485

(51) Int. Cl.
*B62D 6/02* (2006.01)
*B62D 6/00* (2006.01)
*B62D 5/00* (2006.01)
*B62D 5/04* (2006.01)

(52) U.S. Cl.
CPC ............ *B62D 6/002* (2013.01); *B62D 5/001* (2013.01); *B62D 5/003* (2013.01); *B62D 5/006* (2013.01); *B62D 5/046* (2013.01); *B62D 6/02* (2013.01); *B62D 6/008* (2013.01)

(58) Field of Classification Search
CPC ........ B62D 6/002; B62D 5/001; B62D 5/006; B62D 5/003; B62D 6/008; B62D 5/046; B62D 6/02
See application file for complete search history.

(56) References Cited

U.S. PATENT DOCUMENTS

| 5,457,632 A * | 10/1995 | Tagawa ............ B62D 6/04 180/446 |
| 8,068,955 B2 * | 11/2011 | Yanagi .............. B62D 7/148 280/86.758 |
| 8,972,114 B1 | 3/2015 | Han et al. |

(Continued)

FOREIGN PATENT DOCUMENTS

| JP | 2008-174160 A | 7/2008 |
| JP | 2015-020586 A | 2/2015 |

OTHER PUBLICATIONS

Feb. 10, 2017 Extended European Search Report issued in European Patent Application No. 16187783.2.

*Primary Examiner* — Kevin Hurley
*Assistant Examiner* — Marlon A Arce
(74) *Attorney, Agent, or Firm* — Oliff PLC

(57) ABSTRACT

A vehicle steering system includes a higher-level ECU and a lower-level ECU. The lower-level ECU includes a steered angle limit setter, and steered angle limiters. The steered angle limit setter sets an allowable upper limit to a target inner and outer wheel steered angle difference responsive to the absolute value of a target outer steered angle. The steered angle limit setter calculates a limit to the absolute value of a target inner steered angle. The steered angle limit setter subsequently sets this limit for one of the steered angle limiters that is fed the target inner steered angle in the present calculation cycle. The limiter, which is fed the target inner steered angle, limits the absolute value of the target inner steered angle so that the absolute value of the target inner steered angle is equal to or below the limit, and outputs the resulting value.

4 Claims, 4 Drawing Sheets

(56) References Cited

U.S. PATENT DOCUMENTS

| | | | |
|---|---|---|---|
| 2008/0065294 A1 | 3/2008 | Katrak et al. | |
| 2008/0167778 A1* | 7/2008 | Tsukasaki | B62D 5/0418 |
| | | | 701/41 |
| 2010/0235051 A1* | 9/2010 | Kariatsumari | B62D 5/046 |
| | | | 701/41 |
| 2011/0118937 A1* | 5/2011 | Kariatsumari | B62D 5/046 |
| | | | 701/41 |
| 2012/0277956 A1* | 11/2012 | Sasaki | B62D 7/159 |
| | | | 701/41 |
| 2015/0274206 A1* | 10/2015 | Takeda | B62D 6/008 |
| | | | 701/41 |
| 2016/0083007 A1* | 3/2016 | Yim | B62D 6/02 |
| | | | 180/400 |
| 2017/0151978 A1* | 6/2017 | Oya | B62D 5/0487 |

* cited by examiner

VEHICLE STEERING SYSTEM

INCORPORATION BY REFERENCE

The disclosure of Japanese Patent Application No. 2015-179485 filed on Sep. 11, 2015 including the specification, drawings and abstract is incorporated herein by reference in its entirety.

BACKGROUND OF THE INVENTION

1. Field of the Invention

The invention relates generally to vehicle steering systems. More particularly, the invention relates to a vehicle steering system which includes right and left steering operation mechanisms to respectively steer right and left steered wheels, and in which a steering member to be operated in steering a vehicle in a desired direction is mechanically coupled to neither of the right and left steering operation mechanisms, and the right and left steering operation mechanisms are respectively driven by right and left steering motors.

2. Description of the Related Art

The effectiveness of a "steer-by-wire" system is now being valued highly. A steer-by-wire system implements an advanced drive assisting function as typified by automatic driving and has no intermediate shaft so as to increase layout flexibility of an engine room. To further increase engine room layout flexibility, Japanese Patent Application Publication No. 2008-174160 (JP 2008-174160 A) and Japanese Patent Application Publication No. 2015-20586 (JP 2015-20586 A) each disclose a right and left independent steering system for controlling right and left steered wheels by individual steering actuators without using any steering gear device including a rack-and-pinion mechanism.

A steer-by-wire system that employs the concept of the right and left independent steering system may perform steering control using a control system including a higher-level control device to calculate target steered angles for right and left steered wheels, and a lower-level control device to control steering actuators. The lower-level control device of such a control system receives the target steered angles for the right and left steered wheels from the higher-level control device, and controls the steering actuators on the basis of the target steered angles associated thereto. Unfortunately, a malfunction in the higher-level control device of such a control system, such as a breakdown or communication failure, may cause the higher-level control device to supply an inappropriate target steered angle to the lower-level control device.

SUMMARY OF THE INVENTION

An object of the invention is to provide a vehicle steering system that would enable a vehicle to travel stably if a higher-level control device supplies an inappropriate target steered angle to a lower-level control device.

An aspect of the invention relates to a vehicle steering system, which includes a right steering operation mechanism to steer a right steered wheel and a left steering operation mechanism to steer a left steered wheel, and in which a steering member to be operated in steering a vehicle in a desired direction is mechanically coupled to neither of the right steering operation mechanism and the left steering operation mechanism and the right steering operation mechanism is driven by a right steering motor and the left steering operation mechanism is driven by a left steering motor. The system includes a higher-level control device and a lower-level control device. The higher-level control device is configured to set a target right steered angle and a target left steered angle. The target right steered angle is a target value for a steered angle of the right steered wheel. The target left steered angle is a target value for a steered angle of the left steered wheel. The lower-level control device is configured to drive and/or control the right steering motor on the basis of the target right steered angle received from the higher-level control device, and drive and/or control the left steering motor on the basis of the target left steered angle received from the higher-level control device. The lower-level control device includes an allowable upper limit setter and a target steered angle limiter. The allowable upper limit setter is configured to set an allowable upper limit to an absolute value of a difference between the target right steered angle and the target left steered angle in accordance with a selected one of the target right steered angle and the target left steered angle. The target steered angle limiter is configured to limit an absolute value of the selected one of the target right steered angle and the target left steered angle so that the absolute value of the difference between the target right steered angle and the target left steered angle is equal to or below the allowable upper limit set by the allowable upper limit setter.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
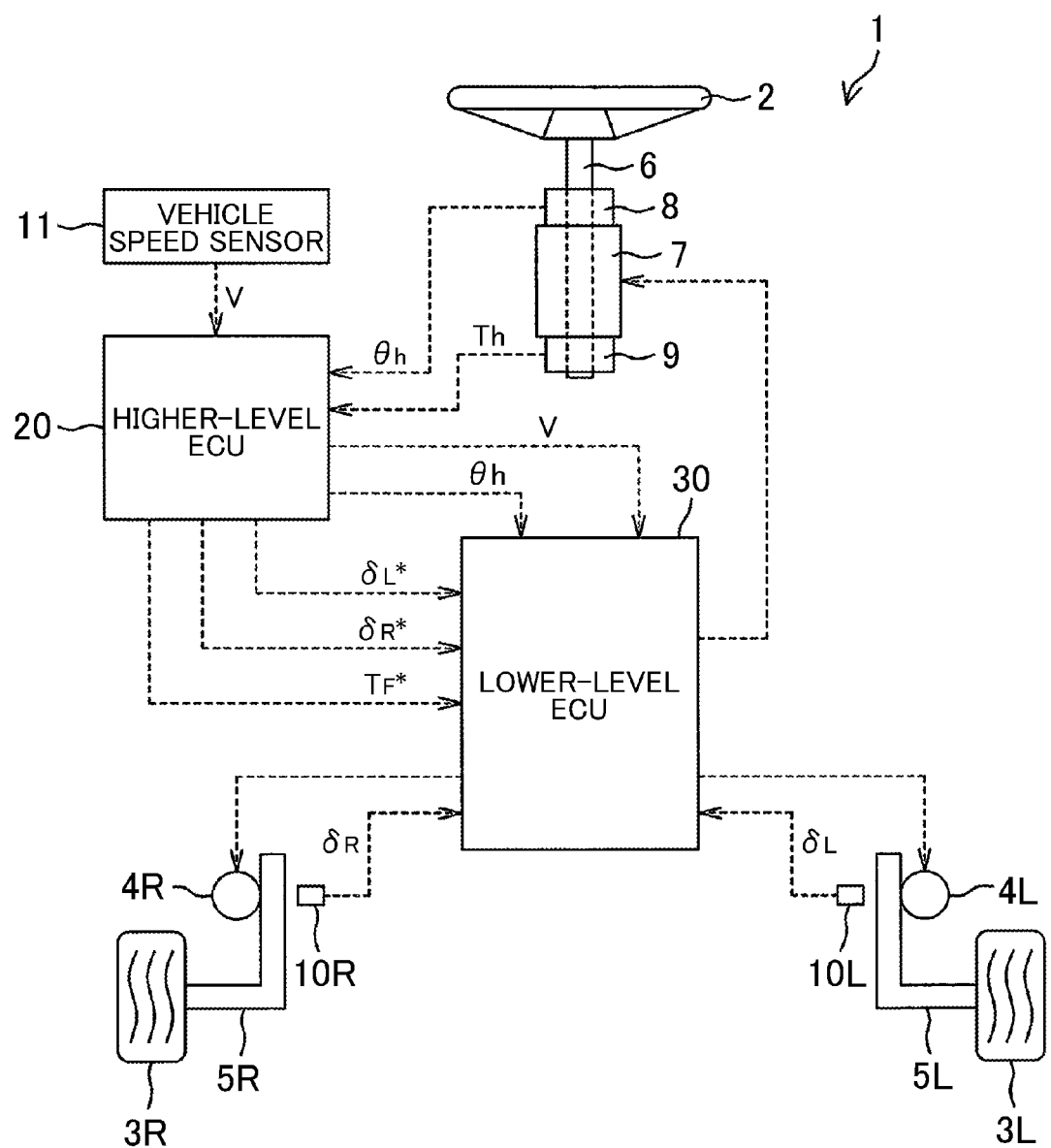
FIG. 1 is a schematic diagram illustrating a configuration of a vehicle steering system according to an embodiment of the invention.

Embodiments of the invention will be described in detail below with reference to the accompanying drawings. FIG. 1 is a schematic diagram illustrating a configuration of a vehicle steering system 1 according to an embodiment of the invention. Specifically, FIG. 1 illustrates a configuration of a steer-by-wire system that employs the concept of a right and left independent steering system. The vehicle steering system 1 includes a steering wheel 2, a right steered wheel 3R, a left steered wheel 3L, a right steering motor 4R, a left steering motor 4L, a right steering operation mechanism 5R, and a left steering operation mechanism 5L. The steering wheel 2 is a steering member to be operated by a driver in steering a vehicle in a desired direction. The right steering motor 4R and the left steering motor 4L are each driven in accordance with rotation of the steering wheel 2. The left steering operation mechanism 5L steers the left steered wheel 3L using a driving force from the left steering motor 4L. The right steering operation mechanism 5R steers the right steered wheel 3R using a driving force from the right steering motor 4R.

When the steering wheel 2 is mechanically coupled to the right steering operation mechanism 5R and the left steering operation mechanism 5L, a steering torque applied to the steering wheel 2 is mechanically transmitted to the right steering operation mechanism 5R and the left steering operation mechanism 5L. This embodiment, however, provides no such mechanical coupling. The right steering motor 4R and the left steering motor 4L are driven and/or controlled in accordance with an operation amount of the steering wheel 2 (a steering angle or a steering torque applied to the steering wheel 2) so as to steer the right steered wheel 3R and the left steered wheel 3L. For example, a suspension device disclosed in JP 2015-20586 A or a steering operation device disclosed in JP 2008-174160 A may be used as each of the right steering operation mechanism 5R and the left steering operation mechanism 5L.

In this embodiment, rotation of the steering motors 4R and 4L in a normal direction changes the steered angles of the steered wheels 3R and 3L so as to steer the vehicle to the right (or steer the steered wheels 3R and 3L to the right). Rotation of the steering motors 4R and 4L in a reverse direction changes the steered angles of the steered wheels 3R and 3L so as to steer the vehicle to the left (or steer the steered wheels 3R and 3L to the left). The steering wheel 2 is coupled to a rotation shaft 6 rotatably supported on the body of the vehicle. The rotation shaft 6 is provided with a reaction motor 7 to generate a reaction torque (or an operation reaction) that acts on the steering wheel 2. The reaction motor 7 is, for example, an electric motor including an output shaft integral with the rotation shaft 6.

The rotation shaft 6 is provided on its periphery with a steering angle sensor 8 to detect a rotation angle of the rotation shaft 6, i.e., a steering angle θh of the steering wheel 2. In this embodiment, the steering angle sensor 8 detects the amount of rotation (or the angle of rotation) of the rotation shaft 6 in both of the normal and reverse directions relative to the neutral position (or reference position) of the rotation shaft 6. The steering angle sensor 8 outputs the amount of clockwise rotation of the rotation shaft 6 relative to the neutral position in the form of a positive value, for example, and outputs the amount of counterclockwise rotation of the rotation shaft 6 relative to the neutral position in the form of a negative value, for example.

The rotation shaft 6 is further provided on its periphery with a torque sensor 9 to detect a steering torque Th applied to the steering wheel 2 by the driver. In this embodiment, the steering torque Th detected by the torque sensor 9 is a positive value when the vehicle is steered to the right and is a negative value when the vehicle is steered to the left. The steering torque Th increases as its absolute value increases.

In the vicinity of the left steering operation mechanism 5L is a left steered angle sensor 10L to detect a steered angle $\delta_L$ of the left steered wheel 3L. In the vicinity of the right steering operation mechanism 5R is a right steered angle sensor 10R to detect a steered angle $\delta_R$ of the right steered wheel 3R. The vehicle steering system 1 further includes a vehicle speed sensor 11 to detect a vehicle speed V. The vehicle speed sensor 11 is provided as an example of a "vehicle speed detector". The steering angle sensor 8, the torque sensor 9, and the vehicle speed sensor 11 are each connected to a higher-level electronic control unit (ECU) 20. The higher-level ECU 20 is provided as a "higher-level control device". The right steered angle sensor 10R, the left steered angle sensor 10L, the right steering motor 4R, the left steering motor 4L, and the reaction motor 7 are each connected to a lower-level electronic control unit (ECU) 30. The lower-level ECU 30 is provided as a "lower-level control device".

The higher-level ECU 20 calculates, in each predetermined calculation cycle, a target right steered angle $\delta_R^*$ and a target left steered angle $\delta_L^*$ on the basis of the steering angle θh detected by the steering angle sensor 8 and the vehicle speed V detected by the vehicle speed sensor 11. The target right steered angle $\delta_R^*$ is a target value for the steered angle of the right steered wheel 3R. The target left steered angle $\delta_L^*$ is a target value for the steered angle of the left steered wheel 3L. The target right steered angle $\delta_R^*$ may hereinafter be referred to as a "target inner steered angle $\delta_{in}^*$" when the right steered wheel 3R is the inner wheel in turning the vehicle, and referred to as a "target outer steered angle $\delta_{out}^*$" when the right steered wheel 3R is the outer wheel in turning the vehicle. The target left steered angle $\delta_L^*$ may hereinafter be referred to as the "target inner steered angle $\delta_{in}^*$" when the left steered wheel 3L is the inner wheel in turning the vehicle, and referred to as the "target outer steered angle $\delta_{out}^*$" when the left steered wheel 3L is the outer wheel in turning the vehicle. The higher-level ECU 20 calculates the target right steered angle $\delta_R^*$ and the target left steered angle $\delta_L^*$ so that the absolute value of the target inner steered angle $\delta_{in}^*$ is greater than the absolute value of the target outer steered angle $\delta_{out}^*$.

The higher-level ECU 20 further calculates, in each predetermined calculation cycle, a target reaction torque $T_F^*$ on the basis of the steering torque Th detected by the torque sensor 9, the steering angle θh detected by the steering angle sensor 8, and the vehicle speed V detected by the vehicle speed sensor 11. The target reaction torque $T_F^*$ is a target value for a reaction torque to be generated by the reaction motor 7. The target right steered angle $\delta_R^*$, the target left steered angle $\delta_L^*$, and the target reaction torque $T_F^*$ calculated by the higher-level ECU 20 are transmitted to the lower-level ECU 30. The steering angle θh detected by the steering angle sensor 8 and the vehicle speed V detected by the vehicle speed sensor 11 are also transmitted from the higher-level ECU 20 to the lower-level ECU 30.

Figure 2:
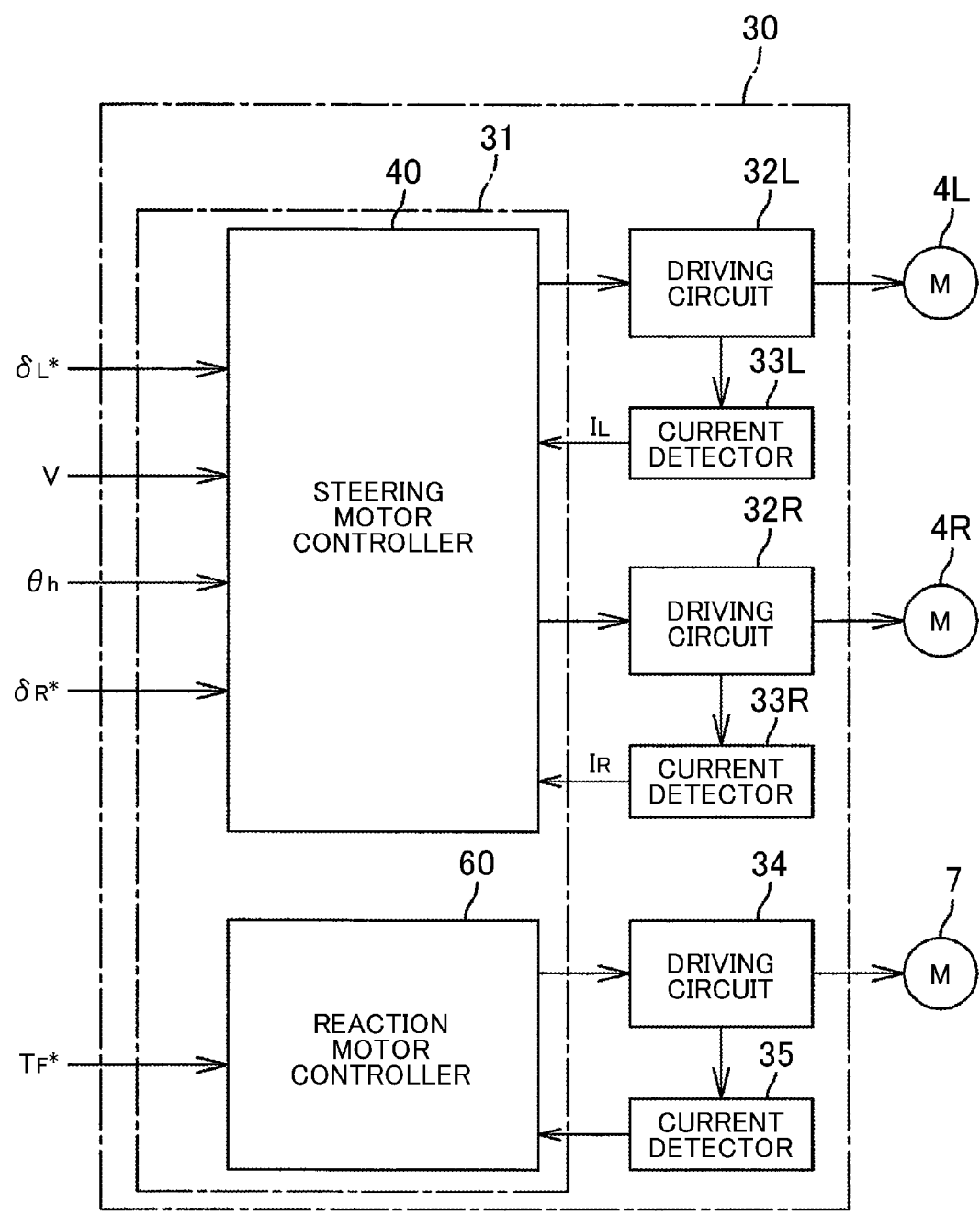
FIG. 2 is a block diagram illustrating an electrical configuration of an electronic control unit (ECU)

FIG. 2 is a block diagram illustrating an electrical configuration of the lower-level ECU 30. The lower-level ECU 30 includes a microcomputer 31, a driving circuit (or inverter circuit) 32L, and a current detector 33L. The microcomputer 31 controls the driving circuit 32L, thus causing the driving circuit 32L to supply electric power to the left steering motor 4L. The current detector 33L detects a motor current flowing through the left steering motor 4L. The lower-level ECU 30 further includes a driving circuit (or inverter circuit) 32R, and a current detector 33R. The microcomputer 31 controls the driving circuit 32R, thus causing the driving circuit 32R to supply electric power to the right steering motor 4R. The current detector 33R detects a motor current flowing through the right steering motor 4R. The lower-level ECU 30 further includes a driving circuit (or inverter circuit) 34, and a current detector 35. The microcomputer 31 controls the driving circuit 34, thus causing the driving circuit 34 to supply electric power to the reaction motor 7. The current detector 35 detects a motor current flowing through the reaction motor 7.

The microcomputer 31 includes a central processing unit (CPU), and memories, such as a read-only memory (ROM), a random-access memory (RAM), and a nonvolatile memory. The microcomputer 31 executes predetermined program(s) so as to function as a plurality of functional processors. The plurality of functional processors include a steering motor controller 40, and a reaction motor controller 60. The steering motor controller 40 controls the right steering motor 4R and the left steering motor 4L. The reaction motor controller 60 controls the reaction motor 7.

The reaction motor controller 60 receives the target reaction torque $T_F^*$ transmitted from the higher-level ECU 20. The reaction motor controller 60 drives and/or controls the driving circuit 34 for the reaction motor 7 in accordance with the target reaction torque $T_F^*$ received. Specifically, the reaction motor controller 60 drives and/or controls the driving circuit 34 so that the reaction motor 7 generates a reaction torque responsive to the target reaction torque $T_F^*$.

Figure 3:
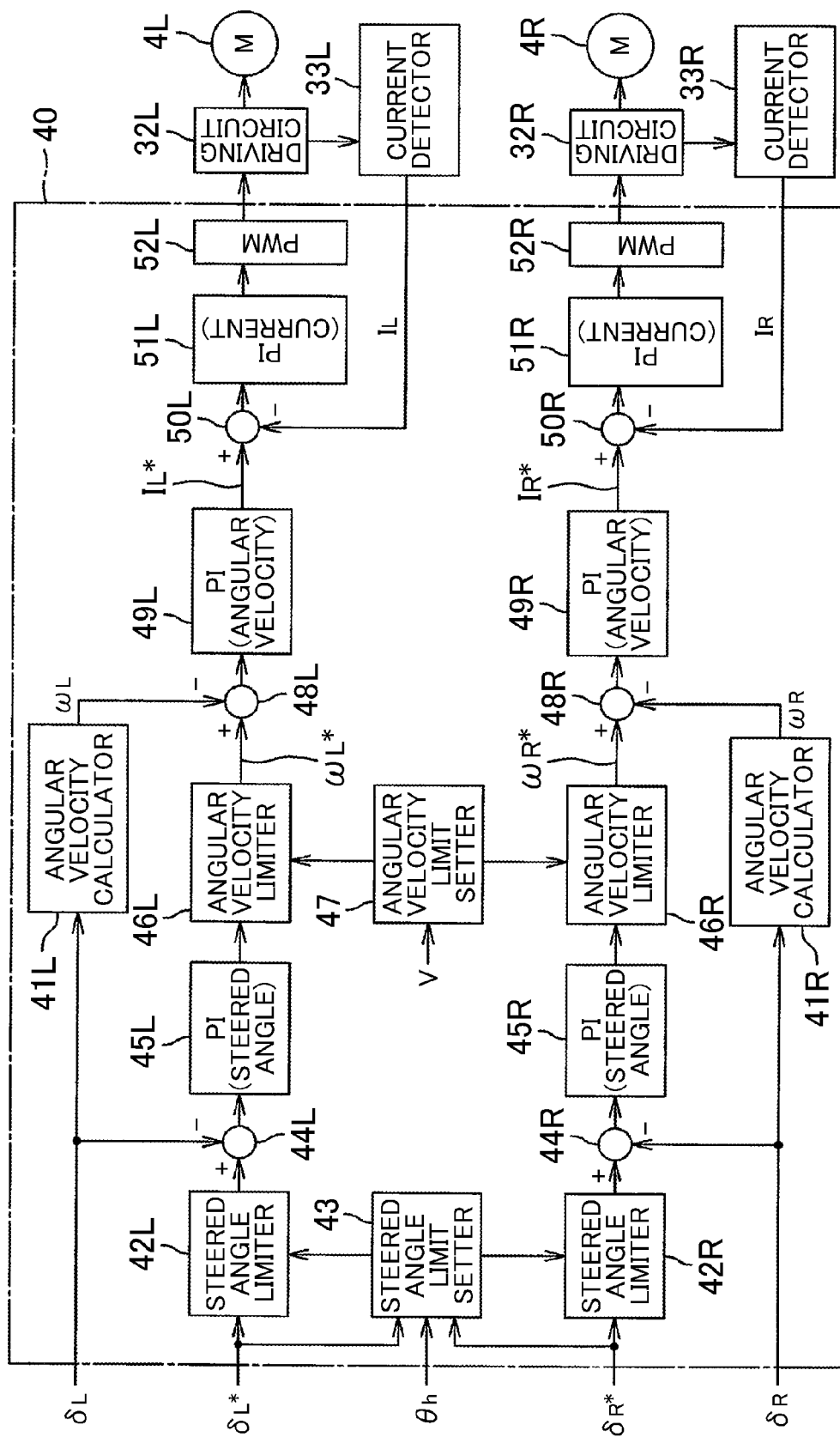
FIG. 3 is a block diagram illustrating an exemplary configuration of a steering motor controller.

The steering motor controller 40 receives the target steered angles $\delta_R^*$ and $\delta_L^*$, the steering angle θh, and the vehicle speed V transmitted from the higher-level ECU 20. The steering motor controller 40 drives and/or controls the driving circuits 32R and 32L for the steering motors 4R and 4L in accordance with the target steered angles $\delta_R^*$ and $\delta_L^*$, the steering angle θh, and the vehicle speed V received. The steering motor controller 40 will be described in detail below. FIG. 3 is a block diagram illustrating an exemplary configuration of the steering motor controller 40.

The steering motor controller 40 includes an angular velocity calculator 41R, an angular velocity calculator 41L, a steered angle limiter 42R, a steered angle limiter 42L, a steered angle limit setter 43, a steered angle difference calculator 44R, a steered angle difference calculator 44L, a steered angle proportional-integral (PI) controller 45R, a steered angle PI controller 45L, an angular velocity limiter 46R, an angular velocity limiter 46L, and an angular velocity limit setter 47. The steering motor controller 40 further includes an angular velocity difference calculator 48R, an angular velocity difference calculator 48L, an angular velocity PI controller 49R, an angular velocity PI controller 49L, a current difference calculator 50R, a current difference calculator 50L, a current PI controller 51R, a current PI controller 51L, a pulse width modulation (PWM) controller 52R, and a PWM controller 52L.

The angular velocity calculator 41L differentiates, with respect to time, the left steered angle $\delta_L$ detected by the left steered angle sensor 10L, thus calculating an angular velocity $\omega_L$ for the left steered angle $\delta_L$. The angular velocity $\omega_L$ for the left steered angle $\delta_L$ may be referred to as a "left steered angular velocity". The angular velocity calculator 41R differentiates, with respect to time, the right steered angle $\delta_R$ detected by the right steered angle sensor 10R, thus calculating an angular velocity $\omega_R$ for the right steered angle $\delta_R$. The angular velocity $\omega_R$ for the right steered angle $\delta_R$ may be referred to as a "right steered angular velocity". The steered angle limiter 42L limits the absolute value of the target left steered angle $\delta_L^*$ received from the higher-level ECU 20 so that the absolute value of the target left steered angle $\delta_L^*$ is equal to or below a limit set by the steered angle limit setter 43. The steered angle limiter 42R limits the absolute value of the target right steered angle $\delta_R^*$ received from the higher-level ECU 20 so that the absolute value of the target right steered angle $\delta_R^*$ is equal to or below a limit set by the steered angle limit setter 43. Details of how the steered angle limiter 42R, the steered angle limiter 42L, and the steered angle limit setter 43 operate will be described below.

The steered angle difference calculator 44L calculates a difference $\Delta\delta_L$ between the target left steered angle $\delta_L^*$ limited by the steered angle limiter 42L and the left steered angle $\delta_L$ detected by the left steered angle sensor 10L. This calculation is represented by the following equation: $\Delta\delta_L = \delta_L^* - \delta_L$. The steered angle difference calculator 44R calculates a difference $\Delta\delta_R$ between the target right steered angle $\delta_R^*$ limited by the steered angle limiter 42R and the right steered angle $\delta_R$ detected by the right steered angle sensor 10R. This calculation is represented by the following equation: $\Delta\delta_R = \delta_R^* - \delta_R$.

The PI controller 45L performs a PI calculation on the left steered angle difference $\Delta\delta_L$ calculated by the steered angle difference calculator 44L, thus calculating a target left steered angular velocity $\omega_L^*$. The target left steered angular velocity $\omega_L^*$ is a target value for the left steered angular velocity. The PI controller 45R performs a PI calculation on the right steered angle difference $\Delta\delta_R$ calculated by the steered angle difference calculator 44R, thus calculating a target right steered angular velocity $\omega_R^*$. The target right steered angular velocity $\omega_R^*$ is a target value for the right steered angular velocity.

The angular velocity limiter 46L limits the absolute value of the target left steered angular velocity $\omega_L^*$ so that the absolute value of the target left steered angular velocity $\omega_L^*$ is equal to or below a limit set by the angular velocity limit setter 47. The angular velocity limiter 46R limits the absolute value of the target right steered angular velocity $\omega_R^*$ so that the absolute value of the target right steered angular velocity $\omega_R^*$ is equal to or below a limit set by the angular velocity limit setter 47. Details of how the angular velocity limiter 46R, the angular velocity limiter 46L, and the angular velocity limit setter 47 operate will be described below.

The angular velocity difference calculator 48L calculates a difference $\Delta\omega_L$ between the target left steered angular velocity $\omega_L^*$ limited by the angular velocity limiter 46L and the left steered angular velocity $\omega_L$ calculated by the angular velocity calculator 41L. This calculation is represented by the following equation: $\Delta\omega_L = \omega_L^* - \omega_L$. The angular velocity difference calculator 48R calculates a difference $\Delta\omega_R$ between the target right steered angular velocity $\omega_R^*$ limited by the angular velocity limiter 46R and the right steered angular velocity $\omega_R$ calculated by the angular velocity calculator 41R. This calculation is represented by the following equation: $\Delta\omega_R = \omega_R^* - \omega_R$.

The PI controller 49L performs a PI calculation on the left steered angular velocity difference $\Delta\omega_L$ calculated by the angular velocity difference calculator 48L, thus calculating a target left motor current $I_L^*$. The target left motor current $I_L^*$ is a target value for a current to be flowed through the left steering motor 4L. The PI controller 49R performs a PI calculation on the right steered angular velocity difference $\Delta\omega_R$ calculated by the angular velocity difference calculator 48R, thus calculating a target right motor current $I_R^*$. The target right motor current $I_R^*$ is a target value for a current to be flowed through the right steering motor 4R.

The current difference calculator 50L calculates a difference $\Delta I_L$ between the target left motor current $I_L^*$ calculated by the PI controller 49L and a left motor current $I_L$ detected by the current detector 33L. This calculation is represented by the following equation: $\Delta I_L = I_L^* - I_L$. The current difference calculator 50R calculates a difference $\Delta I_R$ between the target right motor current $I_R^*$ calculated by the PI controller 49R and a right motor current $I_R$ detected by the current detector 33R. This calculation is represented by the following equation: $\Delta I_R = I_R^* - I_R$.

The PI controller 51L performs a PI calculation on the left motor current difference $\Delta I_L$ calculated by the current difference calculator 50L, thus generating a left motor driving command value. The left motor driving command value is used to bring the left motor current $I_L$, flowing through the left steering motor 4L, to the target left motor current $I_L^*$.

The PI controller 51R performs a PI calculation on the right motor current difference $\Delta I_R$ calculated by the current difference calculator 50R, thus generating a right motor driving command value. The right motor driving command value is used to bring the right motor current $I_R$, flowing through the right steering motor 4R, to the target right motor current $I_R^*$.

The PWM controller 52L generates a left PWM control signal for a duty ratio responsive to the left motor driving command value, and supplies this signal to the driving circuit 32L. Thus, electric power responsive to the left motor driving command value is supplied to the left steering motor 4L. The PWM controller 52R generates a right PWM control signal for a duty ratio responsive to the right motor driving command value, and supplies this signal to the driving circuit 32R. Thus, electric power responsive to the right motor driving command value is supplied to the right steering motor 4R.

The steered angle difference calculator 44L and the PI controller 45L constitute a first angle feedback controller. The first angle feedback controller serves to control the steered angle $\delta_L$ of the left steered wheel 3L so that the steered angle $\delta_L$ is brought close to the target left steered angle $\delta_L^*$ limited by the steered angle limiter 42L. The angular velocity difference calculator 48L and the PI controller 49L constitute a first angular velocity feedback controller. The first angular velocity feedback controller serves to control the left steered angular velocity $\omega_L$ so that the left steered angular velocity $\omega_L$ is brought close to the target left steered angular velocity $\omega_L^*$ limited by the angular velocity limiter 46L. The current difference calculator 50L and the PI controller 51L constitute a first current feedback controller. The first current feedback controller serves to control the motor current $I_L$, flowing through the left steering motor 4L, so that the motor current $I_L$ is brought close to the target left motor current $I_L^*$ calculated by the PI controller 49L.

The steered angle difference calculator 44R and the PI controller 45R constitute a second angle feedback controller. The second angle feedback controller serves to control the steered angle $\delta_R$ of the right steered wheel 3R so that the steered angle $\delta_R$ is brought close to the target right steered angle $\delta_R^*$ limited by the steered angle limiter 42R. The angular velocity difference calculator 48R and the PI controller 49R constitute a second angular velocity feedback controller. The second angular velocity feedback controller serves to control the right steered angular velocity $\omega_R$ so that the right steered angular velocity $\omega_R$ is brought close to the target right steered angular velocity $\omega_R^*$ limited by the angular velocity limiter 46R. The current difference calculator 50R and the PI controller 51R constitute a second current feedback controller. The second current feedback controller serves to control the motor current $I_R$, flowing through the right steering motor 4R, so that the motor current $I_R$ is brought close to the target right motor current $I_R^*$ calculated by the PI controller 49R.

The following description details how the steered angle limiter 42R, the steered angle limiter 42L, and the steered angle limit setter 43 operate. On the basis of the steering angle $\theta h$ received, the steered angle limit setter 43 determines which of the target right steered angle $\delta_R^*$ and the target left steered angle $\delta_L^*$ received is the target inner steered angle $\theta_{in}^*$, and which of the target right steered angle $\delta_R^*$ and the target left steered angle $\delta_L^*$ received is the target outer steered angle $\delta_{out}^*$. Specifically, when the steering angle $\theta h$ is zero or positive, the steered angle limit setter 43 decides that the vehicle is traveling straight ahead or steered to the right. In this case, the steered angle limit setter 43 determines the target right steered angle $\delta_R^*$ to be the target inner steered angle $\delta_{in}^*$, and determines the target left steered angle $\delta_L^*$ to be the target outer steered angle $\delta_{out}^*$. Thus, the steered angle limit setter 43 sets the target right steered angle $\delta_R^*$ to be the target inner steered angle $\delta_{in}^*$, and sets the target left steered angle $\delta_L^*$ to be the target outer steered angle $\delta_{out}^*$.

When the steering angle $\theta h$ is negative, the steered angle limit setter 43 decides that the vehicle is steered to the left. In this case, the steered angle limit setter 43 determines the target left steered angle $\delta_L^*$ to be the target inner steered angle $\delta_{in}^*$, and determines the target right steered angle $\delta_R^*$ to be the target outer steered angle $\delta_{out}^*$. Thus, the steered angle limit setter 43 sets the target left steered angle $\delta_L^*$ to be the target inner steered angle $\delta_{in}^*$, and sets the target right steered angle $\delta_R^*$ to be the target outer steered angle $\delta_{out}^*$.

Figure 4:
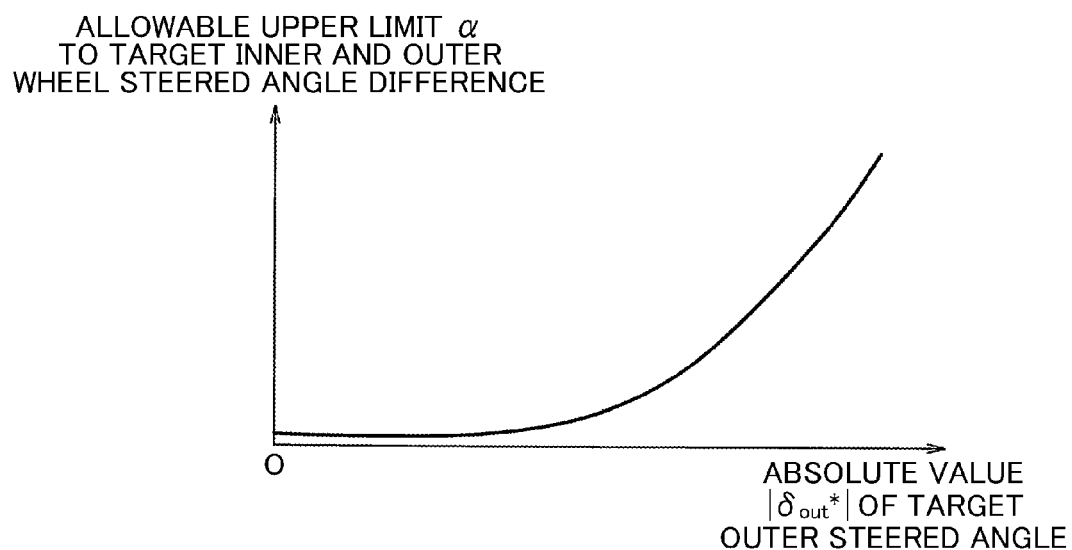
FIG. 4 is a graph illustrating the relationship between an absolute value $|\delta_{out}^*|$ of a target outer steered angle and an allowable upper limit $\alpha$ to a target inner and outer wheel steered angle difference.

As already mentioned above, the absolute value $|\delta_{in}^*|$ of the target inner steered angle $\delta_{in}^*$ is set to be greater than the absolute value $|\delta_{out}^*|$ of the target outer steered angle $\delta_{out}^*$. The absolute value of a difference between the target inner steered angle $\delta_{in}^*$ and the target outer steered angle $\delta_{out}^*$ will hereinafter be referred to as a "target inner and outer wheel steered angle difference" and represented by $|\delta_{in}^* - \delta_{out}^*|$. Unfortunately, if the target inner and outer wheel steered angle difference $|\delta_{in}^* - \delta_{out}^*|$ is excessively large, the vehicle may not be able to travel stably. To overcome this disadvantage, as illustrated in FIG. 4, this embodiment involves setting an allowable upper limit $\alpha$ (where $\alpha > 0$) to the target inner and outer wheel steered angle difference in advance in accordance with the absolute value $|\delta_{out}^*|$ of the target outer steered angle $\delta_{out}^*$. As illustrated in FIG. 4, the allowable upper limit $\alpha$ to the target inner and outer wheel steered angle difference is set such that the greater the absolute value $|\delta_{out}^*|$ of the target outer steered angle $\delta_{out}^*$, the greater the allowable upper limit $\alpha$.

On the basis of a map storing the relationship between the absolute value of the target outer steered angle $\delta_{out}^*$ and the allowable upper limit $\alpha$ to the target inner and outer wheel steered angle difference (see FIG. 4), the steered angle limit setter 43 sets the allowable upper limit $\alpha$ to the target inner and outer wheel steered angle difference in accordance with the absolute value $|\delta_{out}^*|$ of the target outer steered angle $\delta_{out}^*$ received. The steered angle limit setter 43 subsequently calculates a limit $\beta$ (where $\beta > 0$) to the absolute value $|\delta_{in}^*|$ of the target inner steered angle $\delta_{in}^*$ using Equation (1) below:

$$\beta = |\delta_{out}^*| + \alpha \qquad (1)$$

The steered angle limit setter 43 sets the limit $\beta$ for one of the steered angle limiter 42R and the steered angle limiter 42L that is fed the target inner steered angle $\delta_{in}^*$ in the present calculation cycle. One of the steered angle limiter 42R and the steered angle limiter 42L that is fed the target inner steered angle $\delta_{in}^*$ in the present calculation cycle may hereinafter be referred to as a "target inner steered angle limiter $42_{in}$". The target inner steered angle limiter $42_{in}$ limits the absolute value of the target inner steered angle $\delta_{in}^*$, which is fed thereto, so that the absolute value of the target inner steered angle $\delta_{in}^*$ in is equal to or below the limit $\beta$, and then outputs the resulting value. When the absolute value of the target inner steered angle $\delta_{in}^*$ fed to the target inner steered angle limiter $42_{in}$ is equal to or below the limit $\beta$, the target inner steered angle limiter $42_{in}$ outputs the target inner steered angle $\delta_{in}^*$, which is fed thereto, with the target inner steered angle $\delta_{in}^*$ unchanged. In contrast, when the absolute value of the target inner steered angle $\delta_{in}^*$ fed to the target inner steered angle limiter $42_{in}$ is greater than the limit $\beta$, the target inner steered angle limiter $42_{in}$ replaces the absolute value of the target inner steered angle $\delta_{in}^*$, which is fed thereto, with the limit β, and then outputs the resulting value. In this case, the sign for the target inner steered angle $\delta_{in}^*$ remains unchanged.

The steered angle limit setter 43 deactivates one of the steered angle limiter 42R and the steered angle limiter 42L that is fed the target outer steered angle $\delta_{out}^*$ in the present calculation cycle. One of the steered angle limiter 42R and the steered angle limiter 42L that is fed the target outer steered angle $\delta_{out}^*$ in the present calculation cycle may hereinafter be referred to as a "target outer steered angle limiter 42$_{out}$". The target outer steered angle limiter 42$_{out}$ outputs the target outer steered angle $\delta_{out}^*$, which is fed thereto, with the target outer steered angle $\delta_{out}^*$ unchanged.

The steered angle limit setter 43 is provided as an example of an "allowable upper limit setter". The steered angle limit setter 43, the steered angle limiter 42R, and the steered angle limiter 42L are provided as an example of a "target steered angle limiter". Suppose that the target inner and outer wheel steered angle difference $|\delta_{in}^* - \delta_{out}^*|$ is greater than the allowable upper limit α set by the steered angle limit setter 43. In this case, this embodiment involves limiting the absolute value of the target inner steered angle $\delta_{in}^*$ so that the target inner and outer wheel steered angle difference $|\delta_{in}^* - \delta_{out}^*|$ is equal to or below the allowable upper limit α. This would enable the vehicle to travel stably if a malfunction in the higher-level ECU 20, such as a breakdown or communication failure, causes the higher-level ECU 20 to supply an inappropriate target steered angle $\delta_R^*$ or $\delta_L^*$ to the lower-level ECU 30.

Figure 5:
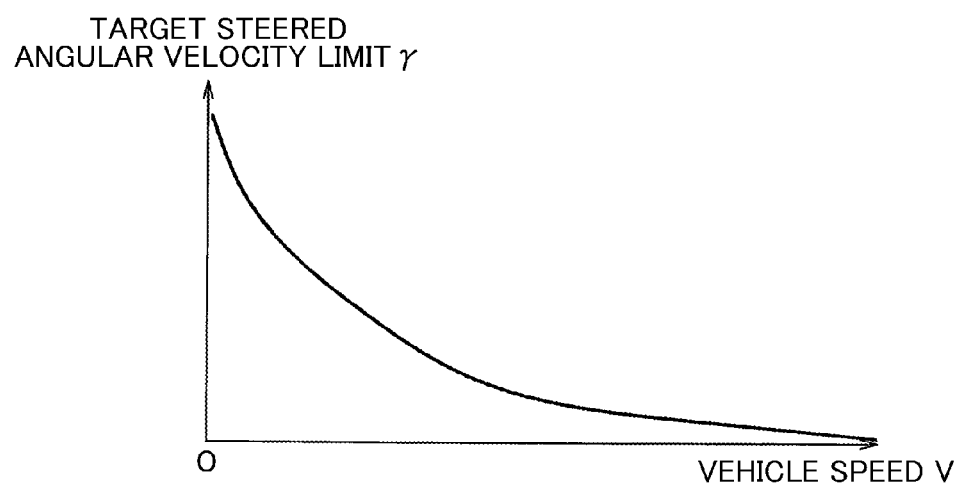
FIG. 5 is a graph illustrating the relationship between a vehicle speed V and a target steered angular velocity limit $\gamma$.

The following description details how the angular velocity limiter 46R, the angular velocity limiter 46L, and the angular velocity limit setter 47 operate. On the basis of a map storing the relationship between the vehicle speed V and a target steered angular velocity limit γ, the angular velocity limit setter 47 sets the target steered angular velocity limit γ responsive to the vehicle speed V received. FIG. 5 is a graph illustrating the relationship between the vehicle speed V and the target steered angular velocity limit γ. The angular velocity limit setter 47 sets the target steered angular velocity limit γ so that the higher the vehicle speed V, the lower the limit γ. This is because when the vehicle speed V is high, a high steered angular velocity may cause the vehicle to travel unstably. For example, the driver runs the vehicle at a low speed in bringing the vehicle into a garage. In such a case, the driver may wish to steer the vehicle at a high steered angular velocity.

The angular velocity limit setter 47 sets the limit γ for the angular velocity limiter 46R and the angular velocity limiter 46L. The angular velocity limiter 46R limits the absolute value of the target steered angular velocity $\omega_R^*$, which is fed thereto, so that the absolute value of the target steered angular velocity $\omega_R^*$ is equal to or below the limit γ. The angular velocity limiter 46L limits the absolute value of the target steered angular velocity $\omega_L^*$, which is fed thereto, so that the absolute value of the target steered angular velocity $\omega_L^*$ is equal to or below the limit γ. When the absolute value of the target steered angular velocity $\omega_R^*$ fed to the angular velocity limiter 46R is equal to or below the limit γ, the angular velocity limiter 46R outputs the target steered angular velocity $\omega_R^*$, which is fed thereto, with the target steered angular velocity $\omega_R^*$ unchanged. When the absolute value of the target steered angular velocity $\omega_L^*$ fed to the angular velocity limiter 46L is equal to or below the limit γ, the angular velocity limiter 46L outputs the target steered angular velocity $\omega_L^*$, which is fed thereto, with the target steered angular velocity $\omega_L^*$ unchanged. When the absolute value of the target steered angular velocity $\omega_R^*$ fed to the angular velocity limiter 46R is greater than the limit γ, the angular velocity limiter 46R replaces the absolute value of the target steered angular velocity $\omega_R^*$, which is fed thereto, with the limit γ, and then outputs the resulting value. In this case, the sign for the target steered angular velocity $\omega_R^*$ remains unchanged. When the absolute value of the target steered angular velocity $\omega_L^*$ fed to the angular velocity limiter 46L is greater than the limit γ, the angular velocity limiter 46L replaces the absolute value of the target steered angular velocity $\omega_L^*$, which is fed thereto, with the limit γ, and then outputs the resulting value. In this case, the sign for the target steered angular velocity $\omega_L^*$ remains unchanged. The angular velocity limit setter 47 is provided as an example of a "steered angular velocity limit setter". The angular velocity limiter 46R and the angular velocity limiter 46L are provided as an example of a "steered angular velocity limiter".

When the absolute value of the target steered angular velocity $\omega_R^*$ is greater than the limit γ responsive to the vehicle speed V, this embodiment involves limiting the absolute value of the target steered angular velocity $\omega_R^*$ so that the absolute value of the target steered angular velocity $\omega_R^*$ is equal to or below the limit γ. When the absolute value of the target steered angular velocity $\omega_L^*$ is greater than the limit γ responsive to the vehicle speed V, this embodiment involves limiting the absolute value of the target steered angular velocity $\omega_L^*$ so that the absolute value of the target steered angular velocity $\omega_L^*$ is equal to or below the limit γ. Such limitation enables the vehicle to travel more stably. Although the embodiment of the invention has been described thus far, the invention may be practiced in other embodiments. For example, the steered angle limit setter 43 according to the foregoing embodiment determines, on the basis of the steering angle θh received, which of the target right steered angle $\delta_R^*$ and the target left steered angle $\delta_L^*$ received is the target inner steered angle $\delta_{in}^*$, and which of the target right steered angle $\delta_R^*$ and the target left steered angle $\delta_L^*$ received is the target outer steered angle $\delta_{out}^*$. Suppose that one of the target right steered angle $\delta_R^*$ and the target left steered angle $\delta_L^*$, received by the steered angle limit setter 43, has a greater absolute value, and the other one of the target right steered angle $\delta_R^*$ and the target left steered angle $\delta_L^*$, received by the steered angle limit setter 43, has a smaller absolute value. In this case, the steered angle limit setter 43 may determine one of the target right steered angle $\delta_R^*$ and the target left steered angle $\delta_L^*$, having the greater absolute value, to be the target inner steered angle $\delta_{in}^*$ and determine the other one of the target right steered angle $\delta_R^*$ and the target left steered angle $\delta_L^*$, having the smaller absolute value, to be the target outer steered angle $\delta_{out}^*$.

In the foregoing embodiment, the angular velocity limiter 46R and the angular velocity limiter 46L, each configured to limit a target angular velocity, are respectively provided downstream of the steered angle PI controller 45R and the steered angle PI controller 45L. In an alternative embodiment, the angular velocity limiter 46R and the angular velocity limiter 46L, each configured to limit a target angular velocity, may be respectively provided downstream of the angular velocity difference calculator 48R and the angular velocity difference calculator 48L. Instead of the angular velocity limiter 46R and the angular velocity limiter 46L, limiters each configured to limit a target current may be provided. In such an embodiment, these limiters are provided downstream of the angular velocity PI controller 49R and the angular velocity PI controller 49L.

Various other design changes may be made within the scope of the invention defined by the claims.

What is claimed is:

1. A vehicle steering system, which includes a right steering operation mechanism to steer a right steered wheel and a left steering operation mechanism to steer a left steered wheel, and in which a steering member to be operated in steering a vehicle in a desired direction is mechanically coupled to neither of the right steering operation mechanism and the left steering operation mechanism, the right steering operation mechanism being driven by a right steering motor and the left steering operation mechanism being driven by a left steering motor, the system comprising:

a higher-level control device to set a target right steered angle and a target left steered angle, the target right steered angle being a target value for a steered angle of the right steered wheel, the target left steered angle being a target value for a steered angle of the left steered wheel; and a lower-level control device to drive and/or control the right steering motor on the basis of the target right steered angle received from the higher-level control device, and drive and/or control the left steering motor on the basis of the target left steered angle received from the higher-level control device, wherein the lower-level control device includes an allowable upper limit setter to set an allowable upper limit to an absolute value of a difference between the target right steered angle and the target left steered angle in accordance with a selected one of the target right steered angle and the target left steered angle, and a target steered angle limiter to limit an absolute value of the selected one of the target right steered angle and the target left steered angle so that the absolute value of the difference between the target right steered angle and the target left steered angle is equal to or below the allowable upper limit set by the allowable upper limit setter.

2. The system according to claim 1, wherein the allowable upper limit setter includes a determiner to determine which of the target right steered angle and the target left steered angle is a target steered angle for an inner wheel in turning the vehicle, and which of the target right steered angle and the target left steered angle is a target steered angle for an outer wheel in turning the vehicle, and a calculator to calculate an allowable upper limit to an absolute value of a difference between a target outer steered angle and a target inner steered angle in accordance with the target outer steered angle, the target outer steered angle being the target steered angle determined for the outer wheel in turning the vehicle, the target inner steered angle being the target steered angle determined for the inner wheel in turning the vehicle, and the target steered angle limiter is configured to limit an absolute value of the target inner steered angle so that the absolute value of the difference between the target outer steered angle and the target inner steered angle is equal to or below the allowable upper limit set by the allowable upper limit setter.

3. The system according to claim 1, wherein the lower-level control device further includes a vehicle speed detector to detect a vehicle speed, a steered angular velocity limit setter to set a steered angular velocity limit on the basis of the vehicle speed detected by the vehicle speed detector, and a steered angular velocity limiter to control a rotational speed of the right steering motor and a rotational speed of the left steering motor so that a steered angular velocity of the right steered wheel and a steered angular velocity of the left steered wheel are each equal to or below the steered angular velocity limit set by the steered angular velocity limit setter.

4. The system according to claim 2, wherein the lower-level control device further includes a vehicle speed detector to detect a vehicle speed, a steered angular velocity limit setter to set a steered angular velocity limit on the basis of the vehicle speed detected by the vehicle speed detector, and a steered angular velocity limiter to control a rotational speed of the right steering motor and a rotational speed of the left steering motor so that a steered angular velocity of the right steered wheel and a steered angular velocity of the left steered wheel are each equal to or below the steered angular velocity limit set by the steered angular velocity limit setter.

* * * * *